United States Patent
Yamashita

(10) Patent No.: US 12,051,542 B2
(45) Date of Patent: Jul. 30, 2024

(54) ELECTRODE FOR ELECTROCHEMICAL DEVICES, AND ELECTROCHEMICAL DEVICE

(71) Applicant: Panasonic Intellectual Property Management Co., Ltd., Osaka (JP)

(72) Inventor: Kazuaki Yamashita, Hokkaido (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 7 days.

(21) Appl. No.: 17/998,657

(22) PCT Filed: May 21, 2021

(86) PCT No.: PCT/JP2021/019294
§ 371 (c)(1),
(2) Date: Nov. 12, 2022

(87) PCT Pub. No.: WO2021/241420
PCT Pub. Date: Dec. 2, 2021

(65) Prior Publication Data
US 2023/0197360 A1   Jun. 22, 2023

(30) Foreign Application Priority Data

May 26, 2020   (JP) ................. 2020-091655

(51) Int. Cl.
*H01G 11/24*   (2013.01)
*C01B 32/33*   (2017.01)
(Continued)

(52) U.S. Cl.
CPC ............ *H01G 11/24* (2013.01); *C01B 32/33* (2017.08); *C01B 32/354* (2017.08); *H01G 11/26* (2013.01);
(Continued)

(58) Field of Classification Search
CPC ........ H01G 11/24; H01G 11/26; H01G 11/32; H01G 11/60; H01G 11/62; H01G 11/86;
(Continued)

(56) References Cited

U.S. PATENT DOCUMENTS

2012/0081838 A1   4/2012 Costantino et al.
2013/0252082 A1   9/2013 Thompkins et al.
(Continued)

FOREIGN PATENT DOCUMENTS

JP            6357639 B       7/2018
WO       2014/057909         4/2014
(Continued)

OTHER PUBLICATIONS

International Search Report of PCT application No. PCT/JP2021/019294 dated Aug. 17, 2021.

*Primary Examiner* — Dion R. Ferguson
(74) *Attorney, Agent, or Firm* — Rimon P.C.

(57) ABSTRACT

An electrode for an electrochemical device includes porous carbon particles. In a pore distribution of the porous carbon particles, a ratio B/A of an integrated volume B to an integrated volume A ranges from 1 to 1.5, inclusive. The integrated volume A is an integrated volume of pores each having a pore diameter of more than or equal to 1 nm and less than 2 nm. The integrated volume B is an integrated volume of pores each having a pore diameter of more than or equal to 2 nm and less than or equal to 50 nm. A volume-based particle diameter frequency distribution of the porous carbon particles has a first peak and a second peak. A particle diameter corresponding to the second peak is larger than a particle diameter corresponding to the first peak.

5 Claims, 2 Drawing Sheets

(51) Int. Cl.
*C01B 32/354* (2017.01)
*H01G 11/26* (2013.01)
*H01G 11/32* (2013.01)
*H01G 11/60* (2013.01)
*H01G 11/62* (2013.01)
*H01G 11/86* (2013.01)

(52) U.S. Cl.
CPC .......... *H01G 11/32* (2013.01); *C01P 2004/61* (2013.01); *C01P 2006/12* (2013.01); *C01P 2006/17* (2013.01); *C01P 2006/40* (2013.01); *H01G 11/60* (2013.01); *H01G 11/62* (2013.01); *H01G 11/86* (2013.01)

(58) Field of Classification Search
CPC ....... H01G 11/34; C01B 32/33; C01B 32/354; C01P 2004/61; C01P 2006/12; C01P 2006/17; C01P 2006/40; Y02E 60/10
See application file for complete search history.

(56) References Cited

U.S. PATENT DOCUMENTS

| 2015/0116907 | A1 | 4/2015 | Ito | |
| 2015/0270071 | A1* | 9/2015 | Ido | H01M 10/0525 241/5 |
| 2018/0366734 | A1* | 12/2018 | Korchev | H01M 4/1391 |
| 2019/0341202 | A1* | 11/2019 | Nishita | C01B 32/354 |
| 2023/0197359 | A1* | 6/2023 | Miyaguchi | H01G 11/58 361/502 |
| 2023/0197360 | A1* | 6/2023 | Yamashita | C01B 32/33 361/502 |

FOREIGN PATENT DOCUMENTS

| WO | WO-2017126698 A1 | * | 7/2017 | ............ H01G 11/06 |
| WO | 2018/092721 | | 5/2018 | |
| WO | WO-2021241420 A1 | * | 12/2021 | ............ C01B 32/33 |
| WO | WO-2022196746 A1 | * | 9/2022 | |

* cited by examiner

ELECTRODE FOR ELECTROCHEMICAL DEVICES, AND ELECTROCHEMICAL DEVICE

TECHNICAL FIELD

The present invention relates to an electrode for an electrochemical device and an electrochemical device.

BACKGROUND

An electrochemical device includes a pair of electrodes and an electrolytic solution, and at least one of the pair of electrodes contains an active material capable of adsorbing and desorbing ions. An electric double layer capacitor, which is an example of an electrochemical device, has a longer life than a secondary battery, can be rapidly charged, has excellent output characteristics, and is widely used as a backup power supply or the like.

As the active material of the electrochemical device, porous carbon particles (activated carbon) obtained by subjecting a raw material such as coconut shell to a carbonization treatment and an activation treatment are used. Various studies have been conducted on activated carbon. For example, Japanese Patent No. 6357639 proposes that a total surface functional group density D in the average cross section of pores of activated carbon is set to a specific range.

SUMMARY

Depending on the distribution of the pores and the particle diameter of the porous carbon particles, the capacitance of the electrochemical device decreases, and the float characteristics thereof tend to deteriorate. Studies on the relationship between the distribution of pores and particle diameters of porous carbon particles and the performance of the electrochemical device are still insufficient.

In view of the above, one aspect of the present invention relates to an electrode for an electrochemical device, the electrode including porous carbon particles. In a pore distribution of the porous carbon particles, a ratio B/A of an integrated volume B to an integrated volume A ranges from 1 to 1.5, inclusive. The integrated volume A is an integrated volume of pores each having a pore diameter of more than or equal to 1 nm and less than 2 nm. The integrated volume B is an integrated volume of pores each having a pore diameter of more than or equal to 2 nm and less than or equal to 50 nm. A volume-based particle diameter frequency distribution of the porous carbon particles has a first peak and a second peak. A particle diameter corresponding to the second peak is larger than a particle diameter corresponding to the first peak.

Another aspect of the present invention relates to an electrochemical device including: a pair of electrodes; and an electrolytic solution, in which at least one of the pair of electrodes is the electrode for an electrochemical device.

According to the present invention, it is possible to suppress deterioration of float characteristics of the electrochemical device while the capacitance of the electrochemical device is increased.

DESCRIPTION OF EMBODIMENT

[Electrode for Electrochemical Device]

Figure 1:
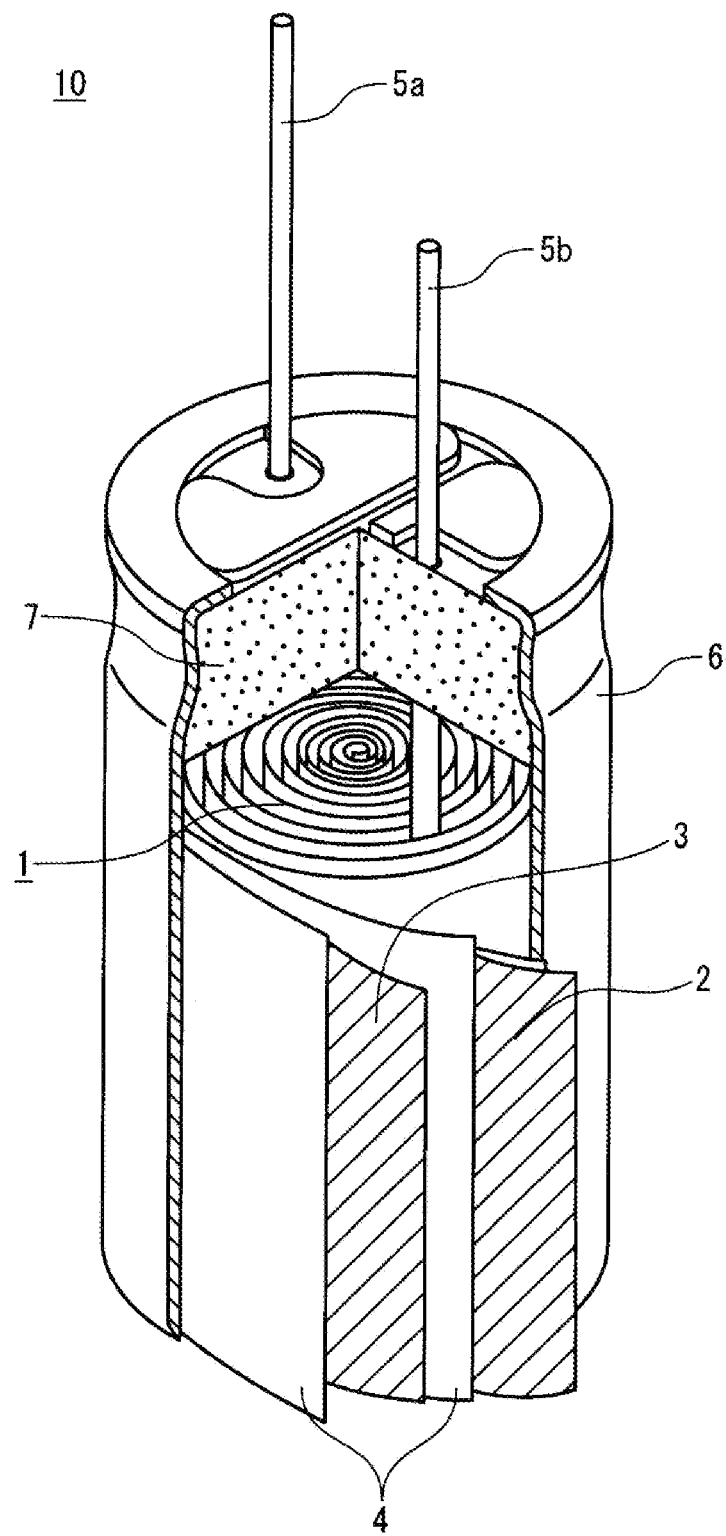
FIG. 1 is a partially cutout perspective view illustrating an electrochemical device according to an exemplary embodiment of the present invention.

An electrode for an electrochemical device according to an exemplary embodiment of the present invention contains porous carbon particles. When ions are adsorbed to the porous carbon particles in the electrolytic solution, an electric double layer is formed to exhibit capacitance. When ions are desorbed from the porous carbon particles, a non-faradaic current flows. The electrode for an electrochemical device according to the present exemplary embodiment utilizes such a phenomenon. In the pore distribution of the porous carbon particles, the ratio B/A of the integrated volume B ($cm^3/g$) of pores each having a pore diameter of more than or equal to 2 nm and less than or equal to 50 nm (hereinafter, also referred to as pores b or mesopores) to the integrated volume A ($cm^3/g$) of pores each having a pore diameter of more than or equal to 1 nm and less than 2 nm (hereinafter, also referred to as pores a or micropores) ranges from 1 to 1.5, inclusive. The volume-based particle diameter frequency distribution (hereinafter, also referred to as particle size distribution) of the porous carbon particles has a first peak and a second peak. A particle diameter corresponding to the second peak is larger than a particle diameter corresponding to the first peak.

The integrated volume A is the total volume ($cm^3$) of the pores a per 1 g of the porous carbon particles. The integrated volume B is the total volume ($cm^3$) of the pores b per 1 g of the porous carbon particles. In addition, the volume-based particle diameter frequency distribution is a volume-based particle size distribution in which the vertical axis is the frequency and the horizontal axis is the particle diameter.

When the above configuration is satisfied, an electrochemical device having a large capacitance (initial capacitance) and excellent float characteristics can be obtained. The float characteristics are an index of the degree of deterioration of the electrochemical device when float charge maintaining a constant voltage is performed with an external DC power supply. It can be said that a small decrease in capacitance and a small increase in internal resistance at the time of float charge indicate better float characteristics.

The pores a mainly contribute to the specific surface area of the porous carbon particles and mainly affect the capacitance (especially, the initial capacitance). The pores b mainly contribute to the mobility of ions in the electrolytic solution in the pores, and mainly affect float characteristics and internal resistance. When the pore diameter is more than or equal to 2 nm, ions in the electrolytic solution are easily diffused in the pores, and the pores are not easily clogged. In the pores having a pore diameter of more than or equal to 2 nm, favorable movement of ions is secured even at a low temperature.

When the B/A ratio is less than 1, the proportion of the pores a increases and the proportion of the pores b decreases, so that ions in the electrolytic solution are less likely to be diffused in the pores or the pores are more likely to be clogged. This may increase the internal resistance and thus deteriorate the float characteristics. When the B/A ratio is more than 1.5, the proportion of the pores a decreases, the proportion of the pores b increases, so that the electrode density decreases, and the initial capacitance may decrease at a low temperature.

In the pore distribution of the porous carbon particles, the proportion of total of the integrated volumes A and B in the total pore volume (total of volumes of all pores in a range of from 1 nm to 100 nm, inclusive) is preferably, for example, from 87% to 90%, inclusive. In this case, many pores a and pores b are distributed, and a large capacitance and excellent float characteristics are easily obtained.

The pore distribution of the porous carbon particles is measured by a gas adsorption method. Nitrogen gas is used as the gas. As the measuring apparatus, for example, an automatic specific surface area/pore distribution measuring apparatus "TriStar II 3020" manufactured by Shimadzu Corporation is used. In order to remove impurities, a sample of porous carbon particles is subjected to a pretreatment of heating and evacuation (for example, less than or equal to 50 mTorr at 250° C.), and then measured. A Barrett-Joyner-Halenda (BJH) method is used to analyze the pore distribution, and the Harkins & Jura equation is used in the BJH method. The integrated volumes A and B are determined using an integrated pore volume distribution obtained by the BJH method.

From the viewpoint of securing the initial capacitance, the porous carbon particles may have a BET specific surface area of from 1,430 m$^2$/g to 2,000 m$^2$/g, inclusive. The BET specific surface area is measured by a gas adsorption method (BET one-point method). Nitrogen gas is used as the gas. As the measuring apparatus, for example, an automatic specific surface area/pore distribution measuring apparatus "TriStar II 3020" manufactured by Shimadzu Corporation is used.

Usually, in order to increase the capacitance, micropores are increased to increase the specific surface area. However, when the number of micropores is increased, the number of mesopores tends to be decreased, so that the float characteristics are deteriorated. On the other hand, in the present invention, the particle size distribution of the porous carbon particles has a first peak and a second peak. A particle diameter corresponding to the second peak is larger than a particle diameter corresponding to the first peak. The first peak (small particle group) contributes to the amount of micropores, and the second peak (large particle group) contributes to the amount of mesopores. Formation of two peaks (first peak and second peak) in the particle size distribution allows both micropores and mesopores to be increased, and allows the B/A ratio to be controlled within the above range. Therefore, the float characteristics can be improved while the capacitance is increased. When there is one peak in the particle size distribution, it is difficult to sufficiently secure both micropores and mesopores. For example, when there is one peak having a maximum frequency in the vicinity of the particle diameter of 4 μm in the particle size distribution, the number of micropores is large, but the number of mesopores is small, the B/A ratio is less than 1, and the float characteristics are deteriorated.

The particle size distribution may have a third peak other than the first peak and the second peak, and the number of the third peaks may be one or more. Each peak has one maximum value (maximum frequency) in the volume-based particle diameter frequency distribution curve. One of the first peak and the second peak is the maximum peak (the peak having the largest maximum value), and the other of the first peak and the second peak is the second largest peak (the peak having the second largest maximum value).

From the viewpoint of easily increasing mesopores together with micropores, the particle diameters at the maximum frequencies of the first peak and the second peak are preferably separated from each other by more than or equal to 4 μm, and more preferably separated from each other in a range of from 4 μm to 7 μm, inclusive. The maximum frequency of the first peak is preferably in a range of particle diameter of less than or equal to 1 μm, and more preferably in a range of particle diameter of from 0.5 μm to 1 μm, inclusive. The maximum frequency of the second peak is preferably in a range of particle diameter of more than 1 μm and less than or equal to 10 μm, more preferably in a range of particle diameter of from 4 μm to 10 μm, inclusive, and still more preferably in a range of particle diameter of from 5 μm to 10 μm, inclusive. The maximum frequency of the first peak is preferably larger than the maximum frequency of the second peak. A ratio F1/F2 of a maximum frequency F1 of the first peak to a maximum frequency F2 of the second peak may be, for example, more than or equal to 1.04, or from 1.04 to 2.1, inclusive. When the above preferable contents are satisfied with respect to the positions (particle diameters at maximum frequencies) and the sizes (maximum frequencies) of the first peak and the second peak, micropores and mesopores can be increased in a well-balanced manner, and the B/A ratio can be easily controlled within the above range.

The particle size distribution of the porous carbon particles is measured by a laser diffraction/scattering method. As the measuring apparatus, for example, a laser diffraction/scattering particle diameter distribution measuring apparatus "MT 3300 EXII" manufactured by MicrotracBEL Corp. is used.

The porous carbon particles can be produced, for example, by subjecting a raw material to a heat treatment to carbonize the raw material, and subjecting the obtained carbide to an activation treatment to obtain the porous particles. The carbide may be crushed and sized before the activation treatment. The porous carbon particles obtained by the activation treatment may be subjected to a pulverization treatment. After the pulverization treatment, a classification treatment may be performed. Examples of the activation treatment include gas activation using a gas such as water vapor, and chemical activation using an alkali such as potassium hydroxide.

Examples of the raw material include wood, coconut shell, pulp waste liquid, coal or coal-based pitch obtained through thermal decomposition of coal, heavy oil or petroleum-based pitch obtained through thermal decomposition of heavy oil, phenol resin, petroleum-based coke, and coal-based coke. Among them, the raw material is preferably petroleum-based coke or coal-based coke. In this case, porous carbon particles having a large proportion of the pores b are easily obtained by the activation treatment.

The petroleum-based coke or the coal-based coke may be subjected to a heat treatment, the obtained carbide may be subjected to an activation treatment to obtain porous carbon particles having a large proportion of the pores b, and then the porous carbon particles may be subjected to a pulverization treatment. In this case, it is easy to control the ratio B/A in the pore distribution to more than or equal to 1 by expressing the first peak and the second peak in the particle size distribution. In this case, the intended pore distribution and particle size distribution can be obtained using one type of porous carbon particles made of the same raw material. An electrochemical device having stable performance can be obtained by inclusion of one type of porous carbon particles made of the same raw material in the electrode. However, when the pulverization treatment is excessively performed, the ratio B/A may be larger than 1.5. For the pulverization treatment, for example, a ball mill or a jet mill is used. Fine porous carbon particles are obtained through the pulverization treatment, and the average particle diameter (D50) thereof is, for example, from 1 μm to 4 μm inclusive. In the present specification, the average particle diameter (D50) means a particle diameter (median diameter) at which the volume integrated value is 50% in the volume-based particle size distribution measured by the laser diffraction/scattering method.

The pore distribution and particle size distribution of the porous carbon particles can be adjusted by, for example, the raw material, the heat treatment temperature, the activation temperature in gas activation, and the degree of pulverization. Further, the pore distribution and the particle size distribution of the porous carbon particles may be adjusted by mixing two types of porous carbon particles made of different raw materials.

At least one of the pair of electrodes may include an active layer, and a current collector that supports the active layer. The active layer contains, as an essential component, the porous carbon particles which are an active material, and may contain a binding agent, a conductive agent, and the like as optional components.

As the binding agent, for example, a resin material such as polytetrafluoroethylene (PTFE), carboxymethyl cellulose (CMC), and styrene-butadiene rubber (SBR) are used. As the conductive agent, for example, carbon black such as acetylene black is used.

The electrode is obtained, for example, by applying a slurry containing porous carbon particles, a binding agent, and/or a conductive agent, and a dispersion medium to a surface of a current collector, drying the coating film, followed by rolling, to thereby form an active layer. As the current collector, for example, a metal foil such as an aluminum foil is used.

[Electrochemical Device]

An electrochemical device according to an exemplary embodiment of the present invention includes a pair of electrodes and an electrolytic solution, and at least one of the pair of electrodes is the above-described electrode for an electrochemical device.

Examples of the electrochemical device include an electric double layer capacitor (EDLC) and a lithium ion capacitor (LIC). When the electrochemical device is EDLC, the electrode for an electrochemical device can be used for at least one of the pair of electrodes. When the electrochemical device is LIC, the electrode for an electrochemical device can be used for one (positive electrode) of the pair of electrodes, and a negative electrode used in a lithium ion secondary battery can be used for the other (negative electrode) of the pair of electrodes. The negative electrode used in a lithium ion secondary battery contains, for example, a negative electrode active material (for example, graphite) capable of absorbing and releasing lithium ions.

The electrolytic solution contains a solvent (non-aqueous solvent) and an ionic substance. The ionic substance is dissolved in the solvent and contains a cation and an anion. The ionic substance may contain, for example, a low melting point compound (ionic liquid) that can exist as a liquid at around normal temperature. The concentration of the ionic substance in the electrolytic solution is, for example, more than or equal to 0.5 mol/L and less than or equal to 2.0 mol/L.

The solvent is preferably a high boiling point solvent. Examples of the solvent that can be used include lactones such as γ-butyrolactone, carbonates such as propylene carbonate, polyhydric alcohols such as ethylene glycol and propylene glycol, cyclic sulfones such as sulfolane, amides such as N-methylacetamide, N,N-dimethylformamide, and N-methyl-2-pyrrolidone, esters such as methyl acetate, ethers such as 1,4-dioxane, ketones such as methyl ethyl ketone, and formaldehyde.

The ionic substance contains, for example, an organic salt. The organic salt is a salt in which at least one of an anion and a cation contains an organic substance. Examples of the organic salt in which a cation contains an organic substance include quaternary ammonium salts. Examples of the organic salt in which an anion (or both ions) contain(s) an organic substance include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

From the viewpoint of improving the withstand voltage characteristics, the anion preferably includes a fluorine-containing acid anion. Examples of the fluorine-containing acid anion include $BF_4^-$ and/or $PF_6^-$. The organic salt preferably contains, for example, a tetraalkylammonium cation and a fluorine-containing acid anion. Specific examples thereof include diethyldimethylammonium tetrafluoroborate ($DEDMABF_4$) and triethylmethylammonium tetrafluoroborate ($TEMABF_4$).

It is preferable to interpose a separator between the pair of electrodes. The separator has ion permeability and has a role of physically separating the pair of electrodes to prevent a short circuit. As the separator, for example, a nonwoven fabric containing cellulose as a main component, a glass fiber mat, or a microporous film made of polyolefin such as polyethylene is used.

Hereinafter, an electrochemical device according to an exemplary embodiment of the present invention will be described with reference to FIG. 1. FIG. 1 is a partially cutout perspective view illustrating an electrochemical device according to an exemplary embodiment of the present invention. The present invention is not limited to the electrochemical device of FIG. 1.

Electrochemical device 10 in FIG. 1 is an electric double layer capacitor, and includes capacitor element 1 which is a wound capacitor element. Capacitor element 1 has a structure in which sheet-like first electrode 2 and sheet-like second electrode 3 are wound with separator 4 interposed therebetween. First electrode 2 and second electrode 3 have a first current collector and a second current collector made of metal, respectively, and a first active layer and a second active layer supported on surfaces of the first current collector and the second current collector, respectively, and exhibit capacitance by adsorbing and desorbing ions. At least one of the first active layer and the second active layer contains the porous carbon particles.

For example, an aluminum foil is used as the current collector. The surface of the current collector may be roughened by a method such as etching. As separator 4, for example, a nonwoven fabric containing cellulose as a main component is used. First lead wire 5a and second lead wire 5b are connected as lead-out members to first electrode 2 and second electrode 3, respectively. Capacitor element 1 is housed in cylindrical outer case 6 together with an electrolytic solution (not shown). The material of outer case 6 may be, for example, metal such as aluminum, stainless steel, copper, iron, or brass. The opening of outer case 6 is sealed with sealing member 7. Lead wires 5a and 5b are led out to the outside to penetrate sealing member 7. For sealing member 7, for example, a rubber material such as butyl rubber is used.

In the above exemplary embodiment, the wound capacitor has been described, but the application range of the present invention is not limited to the above, and the present invention can also be applied to a capacitor having another structure, for example, a stacked capacitor or a coin capacitor.

Hereinafter, the present invention will be described in more detail based on examples, but the present invention is not limited to the examples.

Examples 1 to 3 and Comparative Examples 1 to 3

In this example, a wound electric double layer capacitor having a rated voltage of 2.7 V was produced as an electrochemical device. Hereinafter, a specific method for producing the electrochemical device will be described.
(Production of Electrode)

Porous carbon particles (88 parts by mass) as an active material, polytetrafluoroethylene (6 parts by mass) as a binding agent, and acetylene black (6 parts by mass) as a conductive agent were dispersed in water to prepare a slurry. The obtained slurry was applied to an aluminum (Al) foil (thickness: 30 μm), and the coating film was hot-air dried at 110° C. and rolled to form an active layer (thickness: 40 μm), thereby obtaining an electrode.
(Preparation of Electrolytic Solution)

Diethyldimethylammonium tetrafluoroborate (DEDMABF$_4$) was dissolved in γ-butyrolactone (GBL) to prepare an electrolytic solution. The concentration of DEDMABF$_4$ in the electrolytic solution was 1.0 mol/L.
(Production of Electrochemical Device)

A pair of electrodes were prepared, lead wires were connected to respective electrodes, and the electrodes were wound with a separator made of a cellulose nonwoven fabric interposed therebetween to form a capacitor element. The capacitor element was housed in a predetermined outer case together with an electrolytic solution, and the case was sealed with a sealing member to complete an electrochemical device (electric double layer capacitor). Thereafter, an aging treatment was performed at 60° C. for 16 hours while a rated voltage was applied to the electrochemical device A1.

Figure 2:
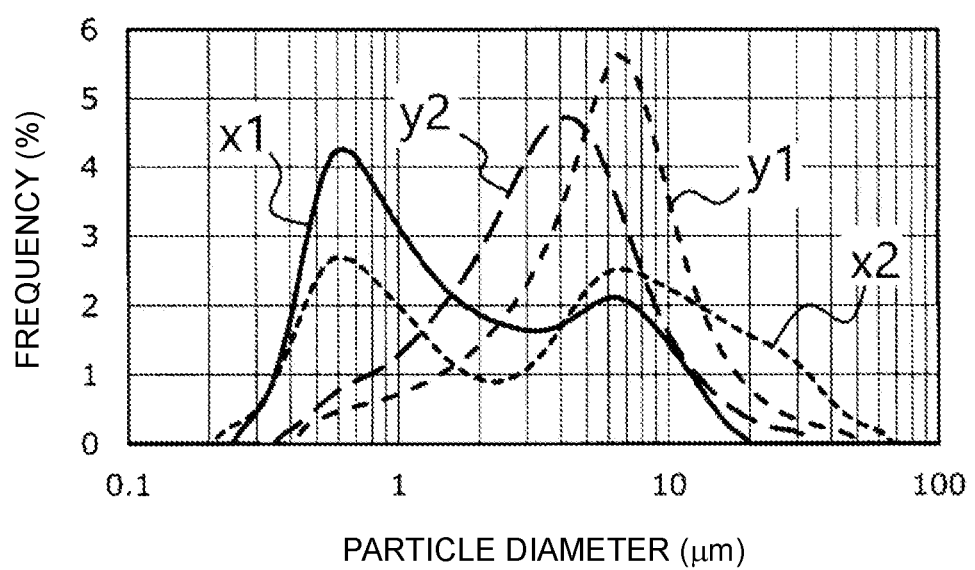
FIG. 2 is a graph showing the particle size distribution of porous carbon particles contained in electrodes included in electrochemical devices of Examples 1 to 2 and Comparative Examples 1 to 2 of the present invention.

In the production of the electrode, porous carbon particles x1 to x3 and y1 to y3 having different pore distributions and particle size distributions were used as active materials. Data on the pore distribution and particle size distribution of each porous carbon particle are shown in Table 1. Table 1 also shows the BET specific surface area. In addition, as an example, the particle size distributions (volume-based particle diameter frequency distributions) of the porous carbon particles x1 to x2 and y1 to y2 are shown in FIG. 2. The pore distribution and the particle size distribution were measured by the methods described above.

TABLE 1

| | Pore distribution | | | |
|---|---|---|---|---|
| Porous carbon particles | Integrated volume A of pores each having a pore diameter of more than or equal to 1 nm and less than 2 nm (cm$^3$/g) | Integrated volume B of pores each having a pore diameter of from 2 nm to 50 nm inclusive (cm$^3$/g) | B/A | BET specific surface area (m$^2$/g) |
| y1 | 0.28 | 0.23 | 0.82 | 1118 |
| x1 | 0.36 | 0.42 | 1.17 | 1570 |
| x2 | 0.33 | 0.35 | 1.06 | 1443 |
| x3 | 0.37 | 0.55 | 1.49 | 1579 |
| y2 | 0.49 | 0.16 | 0.33 | 1847 |
| y3 | 0.33 | 0.53 | 1.61 | 1422 |

| | | Particle size distribution | | | |
|---|---|---|---|---|---|
| | | First peak | | Second peak | |
| Porous carbon particles | Number of peaks | Particle diameter at maximum frequency (μm) | Maximum frequency (%) | Particle diameter at maximum frequency (μm) | Maximum frequency (%) |
| y1 | 1 | 6.54 | 5.64 | — | — |
| x1 | 2 | 0.63 | 4.27 | 6.00 | 2.11 |
| x2 | 2 | 0.58 | 2.69 | 6.54 | 2.53 |
| x3 | 2 | 0.60 | 2.66 | 6.66 | 2.55 |
| y2 | 1 | 4.24 | 4.73 | — | — |
| y3 | 2 | 0.66 | 3.10 | 6.23 | 2.71 |

The porous carbon particles were produced by subjecting a raw material to a heat treatment, subjecting the carbide to an activation treatment, and subjecting the activated carbide to a pulverization treatment (ball mill treatment). The pore distribution and particle size distribution of the porous carbon particles were changed depending on the raw material and the pulverization time. In the porous carbon particles x1 to x3, y1, and y3, coal-based coke was used as a raw material. The porous carbon particles y1 were not subjected to a pulverization treatment. For the porous carbon particles x1 to x3 and y3, the pulverization time was changed. The pulverization time was increased in the order of x2<x1<x3<y3. In the porous carbon particles y3, two peaks appeared in the particle size distribution, but the ratio B/A was larger than 1.5 due to excessive pulverization. In the porous carbon particles y2, the pulverization treatment was performed using coconut shell as a raw material, but the pulverization was insufficient, so that there was one peak in the particle size distribution, and the ratio B/A was smaller than 1.

The average particle diameter (D50) of the porous carbon particles x1 to x3 subjected to the pulverization treatment was in a range of from 1 μm to 4 μm, inclusive. The average particle diameter (D50) of the porous carbon particles y1 not subjected to the pulverization treatment was about 6 μm.

In the porous carbon particles x1 to x3, the first peak and the second peak appeared in the particle size distribution, and the particle diameters at the maximum frequencies of the first peak and the second peak were separated from each other in a range of from 4 μm to 7 μm, inclusive. The maximum frequency of the first peak was in a range of particle diameter of less than or equal to 1 μm, and the maximum frequency of the second peak was in a range of particle diameter of more than 1 μm and less than or equal to 10 μm. The maximum frequency of the first peak was larger than the maximum frequency of the second peak, and the ratio F1/F2 of the maximum frequency F1 of the first peak to the maximum frequency F2 of the second peak was in a range of from 1.04 to 2.1, inclusive. In the porous carbon particles x1 to x3, in the pore distribution, the proportion of total of the integrated volumes A and B in the total pore volume (total of volumes of all pores in a range of from 1 nm to 100 nm inclusive) was in a range of from 87% to 90%, inclusive.

The electrochemical devices of Examples 1 to 3 are electrochemical devices X1 to X3 including a pair of electrodes containing the porous carbon particles x1 to x3. The electrochemical devices of Comparative Examples 1 to 3 are electrochemical devices Y1 to Y3 including a pair of electrodes containing the porous carbon particles y1 to y3.

Each electrochemical device obtained as described above was evaluated as follows.

[Evaluation]

(Measurement of Capacitance and Internal Resistance of Electrochemical Device at Initial Stage (Before Float Test))

Under an environment of −30° C., constant current charge was performed at a current of 100 mA until the voltage reached 2.7 V, and then a state in which a voltage of 2.7 V was applied was maintained for 7 minutes. Thereafter, constant current discharge was performed at a current of 20 mA under an environment of −30° C. until the voltage reached 0 V.

A time t (sec) required for the voltage to drop from 2.16 V to 1.08 V in the discharge was measured. Note that 2.16 V is a voltage corresponding to 80% of 2.7 V (voltage at full charge), and 1.08 V is a voltage corresponding to 40% of 2.7 V. Using measured time t, a capacitance (initial capacitance) C1 (F) of the electrochemical device before the float test was determined from Formula (1) below.

$$\text{Capacitance } C1 = Id \times t / V \quad (1)$$

In Formula (1), Id is a current value (0.02 A) at the time of discharge, and V is a value (1.08 V) obtained by subtracting 1.08 V from 2.16 V.

Using a discharge curve (vertical axis: discharge voltage, horizontal axis: discharge time) obtained by the above discharge, a linear approximate line of the discharge curve in the range of 0.5 seconds to 2 seconds after the start of discharge was obtained, and a voltage VS of the intercept of the linear approximate line was determined. A value (V0−VS) obtained by subtracting the voltage VS from a voltage V0 at the start of discharge (when 0 second has elapsed from the start of discharge) was obtained as ΔV. Using ΔV (V) and the current value Id (0.02 A) at the time of discharge, an internal resistance (DCR) R1 (Ω) of the electrochemical device before the float test was determined from Formula (2) below.

$$\text{Internal resistance } R1 = \Delta V / Id \quad (2)$$

(Float Test of Electrochemical Device)

Under an environment of 70° C., constant current charge was performed at a current of 100 mA until the voltage reached 2.7 V, and then a voltage of 2.7 V was held for 2,000 hours. In this way, the electrochemical device was stored in a state where a voltage of 2.7 V was applied thereto. Thereafter, constant current discharge was performed at a current of 20 mA under an environment of 60° C. until the voltage reached 0 V.

(Measurement of Capacitance and Internal Resistance of Electrochemical Device after Float Test)

Thereafter, the electrochemical device was charged and discharged under an environment of −30° C. in the same manner as in the measurement of the capacitance and internal resistance before the float test. Then, a capacitance C2 (F) and an internal resistance R2 (Ω) after the float test were determined.

(Measurement of Slope of Capacitance Change and Slope of Resistance Change)

Using the capacitance C1 and the capacitance C2 before and after the float test of the electrochemical device obtained as described above, the slope of capacitance change was determined from Formula (3) below. A smaller slope of capacitance change indicates that a decrease in capacitance after the float test is suppressed. In Formula (3), T is a time (2,000 hr) during which float charge was performed in the float test.

$$\text{Slope of capacitance change} = |(C2/C1 - 1) \times 100 / (T^{1/2})| \quad (3)$$

Using the internal resistance R1 and the internal resistance R2 before and after the float test of the electrochemical device obtained as described above, the slope of resistance change was determined from Formula (4) below. A smaller slope of resistance change indicates that an increase in internal resistance after the float test is suppressed. In Formula (4), T is a time (2,000 hr) during which float charge was performed in the float test.

$$\text{Slope of resistance change} = |(R2/R1-1) \times 100/(T^{1/2})| \qquad (4)$$

The evaluation results of the electrochemical devices X1 to X3 and Y1 to Y3 are shown in Table 2. In Table 2, the electrode density is a mass (g) per 1 cm³ of the active layer. The initial capacitance density is a value obtained by dividing the initial capacitance C1 obtained above by the volume of the active layer, and is a capacitance (F) per 1 cm³ of the active layer.

TABLE 2

| | | | Evaluation | | |
|---|---|---|---|---|---|
| | | | | Float characteristics | |
| | | | Initial | (float charge at 70° C. and 2.7 V) | |
| Electrochemical device | Porous carbon particles | Electrode density (g/cm³) | capacitance density (F/cm³) | Slope of capacitance change | Slope of resistance change |
| Y1 | y1 | 0.58 | 10.2 | 1.0 | 2.7 |
| X1 | x1 | 0.50 | 13.1 | 0.7 | 2.4 |
| X2 | x2 | 0.50 | 11.8 | 0.5 | 2.3 |
| X3 | x3 | 0.49 | 11.8 | 0.7 | 2.1 |
| Y2 | y2 | 0.53 | 12.7 | 1.1 | 4.6 |
| Y3 | y3 | 0.46 | 10.8 | 0.5 | 1.6 |

In the electrochemical devices X1 to X3, an electrode containing the porous carbon particles x1 to x3 having a ratio B/A of from 1 to 1.5 inclusive and a particle size distribution having two peaks was used. In the electrochemical devices X1 to X3, the initial capacitance density was large, the slope of capacitance change and slope of resistance change were small, and excellent float characteristics were obtained.

In the electrochemical devices Y1 and Y2, an electrode containing the porous carbon particles y1 and y2 having a ratio B/A of less than 1 and having one peak in particle size distribution was used. In the electrochemical devices Y1 and Y2, the mobility of ions in pores decreased, the slope of capacitance change and slope of resistance change increased, and the float characteristics deteriorated.

In the porous carbon particles y2, large particles were removed by classification after the pulverization treatment, and the BET specific surface area was large. In the electrochemical device Y2, a large initial capacitance density was obtained as compared with the electrochemical device Y1.

In the electrochemical device Y3, an electrode containing the porous carbon particles y3 having a particle size distribution including two peaks, but having a ratio B/A of more than 1.5 was used. In the electrochemical device Y3, the electrode density decreased, and the initial capacitance density decreased.

The electrochemical device according to the present invention is suitably used for applications requiring a large capacitance and excellent float characteristics.

The invention claimed is:

1. An electrode for an electrochemical device, the electrode comprising porous carbon particles, wherein:
   in a pore distribution of the porous carbon particles, a ratio B/A of an integrated volume B to an integrated volume A ranges from 1 to 1.5, inclusive, the integrated volume A being an integrated volume of pores each having a pore diameter of more than or equal to 1 nm and less than 2 nm, the integrated volume B being an integrated volume of pores each having a pore diameter of more than or equal to 2 nm and less than or equal to 50 nm,
   a volume-based particle diameter frequency distribution of the porous carbon particles has a first peak and a second peak, a particle diameter corresponding to the second peak being larger than a particle diameter corresponding to the first peak, and
   the first peak has a maximum frequency larger than a maximum frequency of the second peak.

2. The electrode according to claim 1, wherein the porous carbon particles have a Brunauer-Emmett-Teller (BET) specific surface area ranging from 1,430 m²/g to 2,000 m²/g, inclusive.

3. The electrode according to claim 1, wherein the first peak has a maximum frequency in a range of a particle diameter of less than or equal to 1 μm.

4. The electrode according to claim 3, wherein the second peak has a maximum frequency in a range of a particle diameter of more than 1 μm and less than or equal to 10 μm.

5. An electrochemical device comprising:
   a pair of electrodes; and
   an electrolytic solution,
   wherein at least one of the pair of electrodes is the electrode according to claim 1.

* * * * *